US011560467B2

(12) United States Patent
Tandler et al.

(10) Patent No.: US 11,560,467 B2
(45) Date of Patent: Jan. 24, 2023

(54) POLYOLEFIN COMPOSITION WITH IMPROVED RESISTANCE TO ESCR

(71) Applicant: SABIC GLOBAL TECHNOLOGIES B.V., Bergen op Zoom (NL)

(72) Inventors: Renate Francisca Tandler, Ulestraten (NL); Antonius Sevriens, Geleen (NL); Johannes Petrus Joseph Gerardus Sthijns, Maastricht (NL); Philippe Arthur Rasquin, Fleron (BE); Deliani Lovera, Bunde (NL); Haika Johanna Hildebrandt, Aachen (DE)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 231 days.

(21) Appl. No.: 16/958,883

(22) PCT Filed: Jan. 21, 2019

(86) PCT No.: PCT/EP2019/051341
§ 371 (c)(1),
(2) Date: Jun. 29, 2020

(87) PCT Pub. No.: WO2019/141838
PCT Pub. Date: Jul. 25, 2019

(65) Prior Publication Data
US 2020/0339791 A1 Oct. 29, 2020

(30) Foreign Application Priority Data

Jan. 22, 2018 (EP) .................................... 18152722

(51) Int. Cl.
| | | |
|---|---|---|
| *C08L 23/06* | (2006.01) | |
| *C08L 23/10* | (2006.01) | |
| *C08L 23/08* | (2006.01) | |
| *C08F 110/06* | (2006.01) | |
| *C08F 210/16* | (2006.01) | |
| *C08L 23/12* | (2006.01) | |
| *C08L 23/16* | (2006.01) | |

(52) U.S. Cl.
CPC ......... *C08L 23/0815* (2013.01); *C08F 110/06* (2013.01); *C08F 210/16* (2013.01); *C08L 23/12* (2013.01); *C08L 23/16* (2013.01); *C08L 2203/18* (2013.01); *C08L 2205/03* (2013.01); *C08L 2207/062* (2013.01)

(58) Field of Classification Search
CPC .......... C08L 23/16; C08L 23/10; C08L 23/12; C08L 23/0815; C08L 2205/03; C08L 2207/062
See application file for complete search history.

(56) References Cited

U.S. PATENT DOCUMENTS

| | | | |
|---|---|---|---|
| 6,559,230 B2 | 5/2003 | Heck et al. | |
| 6,734,253 B2 * | 5/2004 | Krabbenborg | ............ C08F 8/34 524/451 |
| 7,456,231 B2 * | 11/2008 | Jackson | ................. C08L 23/06 522/74 |
| 8,703,871 B2 * | 4/2014 | Ikeda | ...................... C08L 23/14 525/240 |
| 8,729,200 B2 | 5/2014 | Hermel-Davidock et al. | |
| 9,701,825 B2 * | 7/2017 | Grestenberger | ......... C08K 3/34 |
| 9,896,573 B2 * | 2/2018 | Hersche | .................. C08L 23/10 |
| 10,450,451 B2 * | 10/2019 | Wang | ....................... C08L 23/16 |
| 10,844,200 B2 * | 11/2020 | Kortmeyer | ............. C08L 23/10 |
| 10,875,992 B2 * | 12/2020 | Wu | ......................... C08L 23/16 |
| 2011/0306715 A1 | 12/2011 | Batra et al. | |
| 2020/0207960 A1 * | 7/2020 | Mileva | .................... C08L 23/14 |

FOREIGN PATENT DOCUMENTS

| | | | | | |
|---|---|---|---|---|---|
| CN | 103923395 A | * | 7/2014 | ............. | C08L 23/12 |
| CN | 105385032 A | * | 3/2016 | ............. | C08L 23/12 |
| CN | 106987079 A | * | 7/2017 | ............. | C08L 53/00 |
| EP | 1688458 A1 | | 8/2006 | | |
| EP | 2077269 B1 | | 1/2008 | | |
| EP | 2010576 B1 | | 1/2009 | | |
| EP | 2076551 B1 | | 7/2009 | | |
| EP | 2185611 B1 | | 5/2010 | | |
| EP | 2326654 B1 | | 6/2011 | | |
| EP | 2365990 B1 | | 9/2011 | | |
| WO | 2011163189 A1 | | 12/2011 | | |
| WO | 2017044533 A1 | | 3/2017 | | |

(Continued)

OTHER PUBLICATIONS

Alt, Frank P., et al., "Bimodal Polyethylene—Interplay of Catalyst and Process", Macromolecular Symposia (2001) 163, 135-143.
Kale et al. "Structure Property Relationships of Ethylene-1-octene Copolymer and Ethylene-1-butene copolymers Made Using Insite Technology" Polymers, Laminations, and Coatings Conference, 1995, pp. 423-433.
International Search Report for International Application No. PCT/EP2019/051341, International Filing Date Jan. 21, 2019, dated Mar. 21, 2019, 6 pages.
PE 100 Pipe Systems, second edition, Heiner Bromstrup (editor), 2004, pp. 16-20 ISBN 3-8027-2728-2.

(Continued)

*Primary Examiner* — Rip A Lee
(74) *Attorney, Agent, or Firm* — Cantor Colburn LLP

(57) ABSTRACT

Polyolefin composition comprising high density polyethylene, polyolefin elastomer and polypropylene, wherein the polypropylene is selected from homopolymer PP or impact PP and wherein the amount of high density polyethylene is more than 40% by weight of the total amount of high density polyethylene, polyolefin elastomer and impact or homopolymer polypropylene and wherein the total amount of high density polyethylene, polyolefin elastomer and polypropylene is 100% by weight and wherein the high density polyethylene has a density in the range from 940 to 960 kg/m3.

20 Claims, No Drawings

(56) References Cited

FOREIGN PATENT DOCUMENTS

WO          2017044547 A1    3/2017
WO    WO 2017/044547 A1 *   3/2017   ............. C08L 23/06

OTHER PUBLICATIONS

Peacock, Andrew J., "Handbook of Polyethylene", Chapter 3 Production Processes, 2000, Marcel Dekker, Inc., New York; ISBN 0824795466; p. 43-66.
Written Opinion for International Application No. PCT/EP2019/051341, International Filing Date Jan. 21, 2019, dated Mar. 21, 2019, 5 pages.

* cited by examiner

POLYOLEFIN COMPOSITION WITH IMPROVED RESISTANCE TO ESCR

CROSS REFERENCE TO RELATED APPLICATIONS

This application is a National Stage application of PCT/EP2019/051341, filed Jan. 21, 2019, which claims the benefit of European Application No. 18152722.7, filed Jan. 22, 2018, both of which are incorporated by reference in their entirety herein.

The present invention relates to a polyolefin composition with improved impact and environmental stress crack resistance (ESCR). In particular, the invention relates to a polyolefin blend comprising high density polyethylene (HDPE), impact or homopolymer polypropylene (PP) and polyolefin elastomer (POE).

HDPE exhibits good properties such as high impact resistance especially at low temperatures, high stiffness, low permeability and good chemical resistance. However, for many applications a high environmental stress crack resistance is required.

Typical examples for articles where a high ESCR is need are solar hot water tanks, dangerous goods containers, pipe system parts and fuel tanks. The need for high environmental stress cracking resistance becomes even more evident in application fields where developments are directed towards down gauging for example caps and closures. This allows not only to save raw material but as well to reduce cycle time and energy consumption. Hence, cost and efficiency in the production process can be optimised. Therefore, material with well-balanced properties are needed. The improvement of environmental stress cracking resistance while maintaining impact properties of the material is an essential part of a product development.

The present invention provides a polyolefin composition with surprisingly improved resistance to environmental stress cracking while maintaining good impact.

The polyolefin composition according to the invention comprises high density polyethylene, polyolefin elastomer and polypropylene, wherein the polypropylene is selected from homopolymer PP or impact PP and wherein the amount of high density polyethylene is more than 40% by weight of the total amount of high density polyethylene, polyolefin elastomer and impact or homopolymer polypropylene and wherein the total amount of high density polyethylene, polyolefin elastomer and polypropylene is 100% by weight and wherein the high density polyethylene has a density in the range from 940 to 960 kg/m$^3$.

The polyethylene compositions according to the invention have a high ESCR, combined with a high impact performance. Surprisingly, it was found that a high ESCR and high impact performance can be achieved without the need for a compatibilizer, such as a block copolymer compatibilizer.

Further the polyethylene composition according to the invention may be simply applied as a dry-blend for obtaining a product or article. An additional compounding step is not necessary.

According to a preferred embodiment of the invention, the polyolefin composition comprises impact or homopolymer polypropylene in a range between >0.1% by weight and ≤40% by weight, preferably between >5% by weight and <35% by weight, more preferably between >10% by weight and <35% by weight, more preferably between ≥15% by weight and ≤30% by weight, wherein the total amount of high density polyethylene, polyolefin elastomer and impact or homopolymer polypropylene is 100% by weight.

According to a preferred embodiment of the invention, the polyolefin composition comprises polyolefin elastomer in a range between >0.1% by weight and ≤40% by weight, preferably between ≥2% by weight and ≤25% by weight, more preferably between ≥5% by weight and ≤21% by weight, more preferably between ≥9% by weight and ≤21% by weight wherein the total amount of high density polyethylene, polyolefin elastomer and impact or homopolymer polypropylene is 100% by weight.

According to a preferred embodiment of the invention, the polyolefin composition comprises high density polyethylene in a range between >41% by weight and <90 by weight, preferably between ≥45% by weight and ≤80% by weight, more preferably between ≥50% by weight and ≤80% by weight, more preferably between ≥50% by weight and ≤75% by weight wherein the total amount of high density polyethylene, polyolefin elastomer and impact or homopolymer polypropylene is 100% by weight.

According to a preferred embodiment of the invention, the polyolefin composition comprises HDPE in a range between ≥41% by weight and <90% by weight, impact or homopolymer PP in a range between >0.1% by weight and ≤40% by weight and POE in a range between >0.1% by weight and ≤40% by weight.

According to a preferred embodiment of the invention, the polyolefin composition comprises HDPE in a range between ≥45% by weight and ≤80% by weight, impact or homopolymer PP in a range between >5% by weight and <35% by weight and POE in a range between ≥2% by weight and ≤25% by weight.

According to a preferred embodiment of the invention, the polyolefin composition comprises HDPE in a range between ≥50% by weight and ≤80% by weight, impact or homopolymer PP in a range between >10% by weight and <35% by weight and POE in a range between ≥5% by weight and ≤21% by weight.

According to a preferred embodiment of the invention, the polyolefin composition comprises HDPE in a range between ≥50% by weight and ≤75% by weight, impact or homopolymer PP in a range between ≥15% by weight and <35% by weight and POE in a range between ≥9% by weight and ≤21% by weight.

According to a preferred embodiment of the invention, the polyolefin composition is characterised in that amount of high density polyethylene is higher than amount of polypropylene and wherein this is based on the wt % of high density polyethylene and the wt % of polypropylene in the composition and/or the amount of polypropylene is higher than the amount of polyolefin elastomer and wherein this is based on the wt % of polypropylene and the wt % of polyolefin elastomer in the composition.

High Density Polyethylene (HDPE)

According to a preferred embodiment of the invention, the polyolefin composition is characterized in that the MFI of high density polyethylene ranges between ≥0.1 and ≤30 g/10 min.

According to another preferred embodiment of the invention, the polyolefin composition is characterized in that the MFI ranges between ≥0.6 and ≤15 g/10 min, more preferably between ≥0.6 and ≤4 g/10 min.

The MFI is measured according to ISO 1133 at 190 degrees Celsius and 2.16 kg.

According to a preferred embodiment of the invention, the polyolefin composition is characterized in that the density of high density polyethylene ranges between ≥940 and ≤958 kg/m³, more preferably ranges between ≥945 and ≤955 kg/m³.

The density is measured according to measured according to ISO 1183.

The HDPE may be unimodal HDPE or multimodal HDPE for example bimodal HDPE or trimodal HDPE. Preferably, the HDPE is bimodal HDPE.

The production processes of the HDPE and is summarised in "Handbook of Polyethylene" by Andrew Peacock (2000; Dekker; ISBN 0824795466) at pages 43-66. Suitable catalysts for the production of polyethylene include Ziegler Natta catalysts, chromium based catalysts and single site metallocene catalysts.

The unimodal polyethylene may be obtained for example by polymerizing ethylene and optionally at least one olefin comonomer in slurry in the presence of a silica-supported chromium-containing catalyst and/or an alkyl boron compound. Suitable comonomers include for example propylene, 1-butene, 1-pentene, 4-methyl-1-pentene, 1-hexene and/or 1-octene.

The unimodal polyethylene may be obtained for example by polymerizing ethylene and optionally at least one olefin comonomer in a gas phase polymerisation or in slurry polymerisation process.

The production processes for bimodal high density polyethylene (HDPE) are summarised at pages 16-20 of "PE 100 Pipe systems" (edited by Bromstrup; second edition, ISBN 3-8027-2728-2). The production of bimodal high density polyethylene (HDPE) via a low pressure slurry process is described by Alt et al. in "Bimodal polyethylene-Interplay of catalyst and process" (Macromol.Symp. 2001, 163, 135-143). The characteristics of the polyethylene are determined amongst others by the catalyst system and by the concentrations of catalyst, comonomer and hydrogen. The production of bimodal high density polyethylene (HDPE) via a low pressure slurry process may also be performed via a three stage process. The concept of the two stage cascade process is elucidated at pages 137-138 by Alt et al. "Bimodal polyethylene-Interplay of catalyst and process" (Macromol. Symp. 2001, 163).

Polyolefin Elastomer (POE)

According to the invention, the polyolefin elastomer is a copolymer. Copolymer needs to be understood as a polymer that is derived from more than one species of monomer. The characteristic sequence arrangements of the monomeric units within the copolymer may for example be statistical or random. Preferably the copolymer is derived from two different monomer species.

Preferably, the copolymerisation is always done in the presence of at least a second monomer in the reaction mixture. Preferably, the monomers are not added in sequence to the reaction mixture.

The polyolefin elastomer according to the invention is a copolymer that does not include block sequence arrangements of the monomeric units within the copolymer (block copolymers).

Block copolymers or copolymers with block sequence arrangement need to be understood as copolymers which are composed of at least two blocks. Block means that adjacent segments are essentially or completely derived from different species of monomer, meaning that the blocks differ in chemical or physical properties. Essentially in this respect should be understood in the sense that more than 70 mol % of the monomeric species based on the total amount of monomeric species of that block are derived from different species of monomer compared to the adjacent block.

Suitable examples of polyolefin elastomers may be ethylene-alpha olefin copolymers and include for example ethylene-1-octene copolymers and ethylene-1-butene copolymers as described for example by L. T. Kale et al in "Structure property relationship of ethylene-1-octene copolymer and ethylene-1-butene copolymer made using insite technology" (1995 Polymers, Lamination and coatings Conference, pages 423-433).

Suitable ethylene-alpha olefin copolymers are also disclosed in U.S. Pat. No. 8,729,200B2, 6,559,230B2, EP2076551B, EP2326654B, EP2077269B, EP2365990B, EP2010576 and EP2185611B.

According to a preferred embodiment of the invention, the polyolefin composition is characterized in that the polyolefin elastomer is an ethylene-alpha olefin copolymer, preferably an ethylene-octene copolymer.

According to a preferred embodiment of the invention, the polyolefin composition is characterized in that MFI of the ethylene-alpha olefin copolymer ranges between ≥0.5 and ≤30 g/10 min, preferably between ≥0.6 and ≤10 g/10 min, more preferably between ≥0.6 and ≤4 g/10 min. The melt flow index (MFI) is measured according to ASTM D1238 at 190 degrees Celcius and 2.16 kg.

According to a preferred embodiment of the invention, the polyolefin composition is characterized in that density of the ethylene-alpha olefin copolymer ranges between ≥857 and ≤880 kg/m³, preferably between ≥865 and ≤870 kg/m³. The density is measured according to ASTM D1505.

Polypropylene (PP)

According to the invention, the PP is characterized in that it is either impact PP or homopolymer PP.

According to a preferred embodiment of the invention, the polyolefin composition is characterized in that the MFI of the PP ranges between >0.3 and <100 g/10 min, preferably ranges between >0.3 and <10 g/10 min, more preferably ranges between >0.3 and <4 g/10 min. The MFI is measured according to ISO1133 at 230 degrees Celsius and 2.16 kg.

According to a preferred embodiment of the invention, the polyolefin composition is characterized in that the density of the PP ranges between ≥900 and ≥920 kg/m³, preferably ranges between >904 and <906 kg/m³. The density is measured according to ISO 1183.

Homopolymer PP

Polypropylene compositions consisting of a propylene homopolymer are known. Propylene homopolymer may be obtained by polymerizing propylene under suitable polymerization conditions.

In contrast to that a propylene copolymer may be obtained by copolymerizing propylene and one or more other olefins, preferably ethylene, under suitable polymerization conditions. The preparation of propylene homopolymers and copolymers is, for example, described in Moore, E. P. (1996) Polypropylene Handbook.

Polymerization, Characterization, Properties, Processing, Applications, Hanser Publishers: New York.

Homopolymer polypropylene can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems.

Impact PP

The impact PP according to the invention is a heterophasic propylene copolymer wherein the heterophasic propylene copolymer consists of
(a) a propylene-based matrix,
wherein the propylene-based matrix consists of a propylene homopolymer and/or a propylene copolymer consisting of at least 70 wt % of propylene and at most 30 wt % of ethylene and/or an α-olefin having 4-10 carbon atoms, based on the total weight of the propylene-based matrix and
wherein the propylene-based matrix is present in an amount of 60 to 95 wt % based on the total heterophasic propylene copolymer and
wherein the propylene-based matrix has a melt flow index of at least 0.1 dg/min and at most 45 dg/min, measured according to ISO1133 (2.16 kg/230° C.) and
(b) a dispersed ethylene-α-olefin copolymer, wherein the dispersed ethylene-α-olefin copolymer is an ethylene-propylene copolymer, wherein the ethylene-α olefin copolymer is present in an amount of 40 to 5 wt % based on the total heterophasic propylene copolymer and
wherein the sum of the total amount of propylene-based matrix and total amount of dispersed ethylene-α-olefin copolymer is 100 wt %.

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratio.

Properties of the Polyolefin Composition

Polyolefin composition according to a preferred embodiment characterised in that the impact performance measured by Izod according to ISO180 using testbar 4 A at 23° C. in machine direction is >50 kJ/m$^2$, preferably >60 kJ/m$^2$, more preferably >69 kJ/m$^2$. Polyolefin composition according to a preferred embodiment characterised in that the ESCR performance measured according to ASTM D1693 Bent Strip ESCR test (Bell test) (10% Igepal CO-630, 50° C.) in machine direction 50% failure is >500 hours, preferably >600 hours, more preferably >650 hours.

According to a preferred embodiment of the invention, the polyolefin composition comprises HDPE in a range between ≥41% by weight and <90% by weight, impact or homopolymer PP in a range between >0.1% by weight and ≤40% by weight and POE in a range between >0.1% by weight and ≤40% by weight, wherein the total amount of HDPE, POE and polypropylene is 100% by weight and
wherein the MFI of HDPE ranges between ≥0.1 and ≤30 g/10 min, the MFI of the PP ranges between >0.3 and <100 g/10 min, the MFI of the POE ranges between ≥0.5 and ≤30 g/10 min and the density of the POE ranges between ≥857 and ≤880 kg/m$^3$.

According to a preferred embodiment of the invention, the polyolefin composition comprises HDPE in a range between ≥45% by weight and ≤80% by weight, impact or homopolymer PP in a range between >5% by weight and <35% by weight and POE in a range between ≥2% by weight and ≤25% by weight, wherein the total amount of HDPE, POE and polypropylene is 100% by weight and
wherein the MFI ranges of the HDPE ranges between ≥0.6 and ≤15 g/10 min, the density of the HDPE ranges between ≥940 and ≤958 kg/m$^3$, the MFI of the PP ranges between >0.3 and <100 g/10 min, the MFI of the POE between ≥0.6 and ≤10 g/10 min and the density of POE ranges between ≥857 and ≤880 kg/m$^3$.

According to a preferred embodiment of the invention, the polyolefin composition comprises HDPE in a range between ≥50% by weight and ≤80% by weight, impact or homopolymer PP in a range between >10% by weight and <35% by weight and POE in a range between ≥5% by weight and ≤21% by weight, wherein the total amount of HDPE, POE and polypropylene is 100% by weight and wherein the
MFI of the HDPE ranges between ≥0.6 and ≤15 g/10 min, the density of the HDPE ranges between ≥940 and ≤958 kg/m$^3$, the MFI of the PP ranges between >0.3 and <100 g/10 min, the MFI of POE ranges between ≥0.6 and ≤0 g/10 min and the density of POE ranges between ≥865 and ≤870 kg/m$^3$.

According to a preferred embodiment of the invention, the polyolefin composition comprises HDPE in a range between ≥50% by weight and ≤75% by weight, impact or homopolymer PP in a range between ≥15% by weight and <35% by weight and POE in a range between ≥9% by weight and ≤21% by weight, wherein the total amount of HDPE, POE and polypropylene is 100% by weight and wherein the
MFI of the HDPE ranges between ≥0.6 and ≤4 g/10 min, the density of the HDPE ranges between ≥945 and ≤955 kg/m$^3$, the MFI of the PP ranges between >0.3 and <4 g/10 min, the POE is an ethylene-octene copolymer, the MFI of POE ranges between ≥0.6 and ≤4 g/10 min and the density of POE ranges between ≥865 and ≤870 kg/m$^3$.

According to a preferred embodiment of the invention, the polyolefin composition comprises HDPE in a range between ≥41% by weight and <90% by weight, impact or homopolymer PP in a range between >0.1% by weight and ≤40% by weight and POE in a range between >0.1% by weight and ≤40% by weight, wherein the total amount of HDPE, POE and polypropylene is 100% by weight and wherein the polyolefin composition is characterised in that the impact performance measured by Izod according to ISO180 using testbar 4 A at 23° C. in machine direction is >50 kJ/m$^2$, and the ESCR performance measured according to ASTM D1693 Bent Strip ESCR test (Bell test) (10% Igepal CO-630, 50° C.) in machine direction 50% failure is >500 hours.

According to a preferred embodiment of the invention, the polyolefin composition comprises HDPE in a range between ≥45% by weight and ≤80% by weight, impact or homopolymer PP in a range between >5% by weight and <35% by weight and POE in a range between ≥2% by weight and ≤25% by weight, wherein the total amount of HDPE, POE and polypropylene is 100% by weight and wherein the
the polyolefin composition is characterised in that the impact performance measured by Izod according to ISO180 using testbar 4 A at 23° C. in machine direction is >60 kJ/m$^2$, and the ESCR performance measured according to ASTM D1693 Bent Strip ESCR test (Bell test) (10% Igepal CO-630, 50° C.) in machine direction 50% failure is >600 hours.

According to a preferred embodiment of the invention, the polyolefin composition comprises HDPE in a range between ≥50% by weight and ≤80% by weight, impact or homopolymer PP in a range between >10% by weight and <35% by weight and POE in a range between ≥5% by weight and ≤21% by weight, wherein the total amount of HDPE, POE and polypropylene is 100% by weight and wherein the and wherein the polyolefin composition is characterised in that the impact performance measured by Izod according to ISO180 using testbar 4 A at 23° C. in machine direction is >69 kJ/m$^2$ and the ESCR performance measured according to ASTM D1693 Bent Strip ESCR test (Bell test) (10% Igepal CO-630, 50° C.) in machine direction 50% failure is >650 hours.

According to a preferred embodiment of the invention, the polyolefin composition comprises HDPE in a range between ≥50% by weight and ≤75% by weight, impact or homopolymer PP in a range between ≥15% by weight and <35% by weight and POE in a range between ≥9% by weight and ≤21% by weight, wherein the total amount of HDPE, POE and polypropylene is 100% by weight and wherein the the polyolefin composition is characterised in that the impact performance measured by Izod according to ISO180 using testbar 4 A at 23° C. in machine direction is >69 kJ/m$^2$ and the ESCR performance measured according to ASTM D1693 Bent Strip ESCR test (Bell test) (10% Igepal CO-630, 50° C.) in machine direction 50% failure is >650 hours.

According to a preferred embodiment of the invention, the polyolefin composition comprises HDPE in a range between ≥41% by weight and <90% by weight, impact or homopolymer PP in a range between >0.1% by weight and ≤40% by weight and POE in a range between >0.1% by weight and ≤40% by weight, wherein the total amount of HDPE, POE and polypropylene is 100% by weight and wherein the MFI of HDPE ranges between ≥0.1 and ≤30 g/10 min, the MFI of the PP ranges between >0.3 and <100 g/10 min, the MFI of the POE ranges between ≥0.5 and ≤30 g/10 min and the density of the POE ranges between ≥857 and ≤880 kg/m$^3$ and wherein the polyolefin composition is characterised in that the impact performance measured by Izod according to ISO180 using testbar 4 A at 23° C. in machine direction is >50 kJ/m$^2$, and the ESCR performance measured according to ASTM D1693 Bent Strip ESCR test (Bell test) (10% Igepal CO-630, 50° C.) in machine direction 50% failure is >500 hours.

According to a preferred embodiment of the invention, the polyolefin composition comprises HDPE in a range between ≥50% by weight and ≤75% by weight, impact or homopolymer PP in a range between ≥15% by weight and <35% by weight and POE in a range between ≥9% by weight and ≤21% by weight, wherein the total amount of HDPE, POE and polypropylene is 100% by weight and wherein the MFI of the HDPE ranges between ≥0.6 and ≤4 g/10 min, the density of the HDPE ranges between ≥945 and ≤955 kg/m$^3$, the MFI of the PP ranges between >0.3 and <4 g/10 min, the POE is an ethylene-octene copolymer, the MFI of POE ranges between ≥0.6 and ≤4 g/10 min and the density of POE ranges between ≥865 and ≤870 kg/m$^3$ and wherein the polyolefin composition is characterised in that the impact performance measured by Izod according to ISO180 using testbar 4 A at 23° C. in machine direction is >50 kJ/m$^2$, and the ESCR performance measured according to ASTM D1693 Bent Strip ESCR test (Bell test) (10% Igepal CO-630, 50° C.) in machine direction 50% failure is >500 hours.

The polymer composition comprising high density polyethylene, a polyolefin elastomer and impact or homopolymer polypropylene may be applied as dry blend and as a compound.

All components may be added directly on the injection molding machine using a gravimetric dosing system.

All components can be added together as a dry blend. Mixing of the materials can be done by industrial mixing devices, such as Nauta mixer and Henschel mixers.

All components may be added together as a compound by melt blending. The compounding is usually carried out in a mixer (also known as a compounder), a single screw extruder or a twin screw extruder, wherein the polymer and the additives are melt-blended. Compounding techniques are well-known in the art.

The polymers in the resin composition and also the resin composition according to the invention may contain additives, for instance nucleating agents and clarifiers, stabilizers, release agents, fillers, plasticizers, anti-oxidants, lubricants, antistatics, scratch resistance agents, high performance fillers, pigments and/or colorants, impact modifiers, blowing agents, acid scavengers, recycling additives, coupling agents, anti-microbial, anti-fogging additives, slip additives, anti-blocking additives, flame retardants and polymer processing aids. These additives are well known in the art. The skilled person will choose the type and amount of additives such that they do not detrimentally influence the aimed properties of the composition.

According to a preferred embodiment of the invention, the polyolefin composition are used for the production of injection molded articles and blow molded articles.

According to another preferred embodiment of the invention, the polyolefin composition are used for the production of pipe system parts, solar hot water tanks, dangerous goods containers, industrial containers, fuel tanks, caps or closures.

Further, the invention is directed to a blow molded article or an injection molded article comprising the polyolefin composition according to the invention.

Further, the invention is directed to pipe system parts, solar hot water tanks, dangerous goods containers, industrial containers, fuel tanks, caps or closures comprising the polyolefin composition according to the invention.

According to another preferred embodiment of the invention, the polyolefin composition is used for the production of parts in automotive applications. This may for example be airducts and windscreen washer tanks.

According to another preferred embodiment of the invention, the polyolefin composition is used for the production of fuel tanks for lawnmower, boats, chainsaws, tractors, garden equipment.

The invention will now be illustrated by the following non-limiting examples.

EXAMPLES

Materials

The materials mentioned in Table 1 were used.

TABLE 1

Used Materials.

| Polyolefin | Grade name | MFI in g/10 min Measurement method | Density in kg/m$^3$ Measurement method |
|---|---|---|---|
| HDPE | SABIC, CC253 | 1.8 ISO 1133-1: 2011 2.16 kg at 190° C. | 953 ISO 1183-1: 2012 |
| POE | SABIC, C1070D | 1.0 ASTM D1238 | 868 ASTM D1505 |
| PP random | SABIC, 620P | 1.7 ISO 1133-1: 2011 2.16 kg at 230° C. | 905 ISO 1183-1: 2012 |
| PP impact | SABIC, 83MF90 | 1.8 ISO 1133-1: 2011 2.16 kg at 230° C. | 905 ISO 1183-1: 2012 |
| PP homoploymer | SABIC, 505P | 2.0 ISO 1133-1: 2011 2.16 kg at 230° C. | 905 ISO 1183-1: 2012 |

Sample Preparation

All components were added together as a dry blend and directly used for injection molding. The dry blends were injection molded on a Arburg Allrounder machine using a standard mold. Injection molding techniques are well-known in the art.

Measurement Methods

Bell Test

The ESCR was measured according to ASTM D1693 Bent Strip ESCR test (Bell test) (10% Igepal CO-630, 50° C.).

Izod

Impact was measured by Izod according to ISO180 using testbar 4 A at 23° C.

Results

Table 2 and Table 3 give an overview of the prepared samples and their ESCR and Impact performance. The inventive examples of Table 2 comprise impact PP, the inventive examples of Table 3 comprise PP homopolymer. Measurements were performed on the injection molded samples in machine direction.

TABLE 2

Overview of Comparative and Inventive examples and measurement results. The inventive examples comprise HDPE, impact PP and POE.

| | Example | HDPE CC253 wt % | POE C1070D wt % | Impact PP 83MF90 (apart from C4) wt % | Izod impact kJ/m$^2$ | Bell test 50% failure hours |
|---|---|---|---|---|---|---|
| comparative examples | C1 | 100 | — | — | 19.8 | 16 |
| | C2 | 80 | 20 | — | 74.3 | 209 |
| | C3 | 70 | — | 30 | 74.4 | 476 |
| | C4 | 75 | 10 | 15 random PP 620P | 79.6 | 137 |
| inventive examples | Inv. 1 | 50 | 20 | 30 | 70.7 | >1000 |
| | Inv. 2 | 75 | 10 | 15 | 77.4 | 674 |

The inventive examples Inv.1 and Inv.2 show in comparison to pure HDPE, example C1, an enormous improvement in impact, measured by Izod, and in ESCR, measured by the Bell test.

Blends of HDPE and POE show a higher impact and ESCR performance in comparison to pure HDPE, which is demonstrated here by C2 in comparison to C1. However, the ESCR of HDPE and POE blends is not as good as in comparison to the inventive examples, which is shown here for C2 comparison to Inv. 1.

This is also the case for blends of HDPE and impact PP, as shown for example C3. The inventive samples have a comparable impact performance, but much better ESCR.

Blends of HDPE, POE and random PP do not lead to such high ESCR performance either. This is shown for example C4 in comparison to Inv. 2.

Best impact and ESCR performance are achieved for the inventive examples Inv.1 and Inv.2

TABLE 3

Overview of Comparative examples and Inventive examples and measurement results. The inventive examples comprise HDPE, PP homopolymer and POE.

|  |  | HDPE CC253 wt % | POE C1070D wt % | homopolymer PP 505P wt % | Izod impact kJ/m² | Bell test 50% failure hours |
|---|---|---|---|---|---|---|
| comparative examples | C1 | 100 |  |  | 19.8 | 16 |
|  | C2 | 80 | 20 | — | 74.3 | 209 |
|  | C5 | 70 |  | 30 | 18.6 | 42 |
| inventive examples | Inv. 3 | 50 | 20 | 30 | 82.8 | >1000 |
|  | Inv. 4 | 65 | 20 | 15 | 77.5 | >1000 |
|  | Inv. 5 | 60 | 10 | 30 | 86.1 | >1000 |

The inventive examples Inv.3, Inv.4 and Inv.5 show in comparison to pure HDPE, example C1, an enormous improvement in impact, measured by Izod, and in ESCR, measured by the Bell test.

Blends of HDPE and POE show a higher impact and ESCR performance in comparison to pure HDPE, which is demonstrated here by C2 in comparison to C1. However, the ESCR of HDPE and POE blends is not as good as in comparison to the inventive examples, which is shown here for C2 comparison to Inv. 3 and Inv.4.

Blends of HDPE and PP homopolymer show the same impact and an only slightly improved ESCR performance in comparison to pure HDPE, which is demonstrated here by C5 in comparison to C1. However, the ESCR of HDPE and PP homopolymer blends is not as good as in comparison to the inventive examples, which is shown here for C5 comparison to Inv. 3.

Best impact and ESCR performance are achieved for the inventive examples Inv.3, Inv.4 and Inv.5.

The invention claimed is:

1. A polyolefin composition comprising a high density polyethylene, a polyolefin elastomer and a polypropylene,
    wherein the polypropylene is selected from a polypropylene homopolymer or an impact polypropylene and
    wherein an amount of the high density polyethylene is more than 40% by weight,
    wherein a total amount of the high density polyethylene, the polyolefin elastomer and the polypropylene homopolymer or impact polypropylene is 100% by weight and
    wherein the high density polyethylene has a density in a range from 940 to 960 kg/m³,
    the polyolefin elastomer is an ethylene-octene copolymer, and
    a melt flow index of the polypropylene is greater than 0.3 g/10 min and less than 10 g/10 min, measured according to ISO 1133 at 230 degrees Celsius and 2.16 kg.

2. The polyolefin composition according to claim 1, wherein the polyolefin composition comprises the polypropylene homopolymer or impact polypropylene in an amount of greater than 0.1% by weight to less than or equal to 40% by weight, wherein the total amount of the high density polyethylene, the polyolefin elastomer and the polypropylene homopolymer or impact polypropylene is 100% by weight.

3. The polyolefin composition according to claim 1, wherein the polyolefin composition comprises the polyolefin elastomer in an amount of greater than 0.1% by weight to less than or equal to 40% by weight, wherein the total amount of the high density polyethylene, the polyolefin elastomer and the polypropylene homopolymer or impact polypropylene is 100% by weight.

4. The polyolefin composition according to claim 1, wherein the polyolefin composition comprises the high density polyethylene in an amount of greater than 41% by weight to less than 90% by weight, wherein the total amount of the high density polyethylene, the polyolefin elastomer and the polypropylene homopolymer or impact polypropylene is 100% by weight.

5. The polyolefin composition according to claim 1, wherein an amount of the high density polyethylene is higher than an amount of the polypropylene based on a wt % of the high density polyethylene and a wt % of polypropylene in the composition.

6. The polyolefin composition according to claim 1, wherein a melt flow index of the high density polyethylene ranges between 0.1 and 30 g/10 min, measured according to ISO 1133 at 190 degrees Celsius and 2.16 kg and/or a density of the high density polyethylene ranges between 940 and 958 kg/m³, measured according to ISO 1183.

7. The polyolefin composition according to claim 1, wherein a density of the polypropylene ranges between 900 kg/m³ and 920 kg/m³, measured according to ISO 1183.

8. The polyolefin composition according to claim 1, wherein a melt flow index of the polyolefin elastomer ranges between 0.5 g/10 mi and 30 g/10 min, measured according to ASTM D1238 at 190 degrees Celsius and 2.16 kg and/or a density of the polyolefin elastomer ranges between 857 kg/m³ and 880 kg/m³ measured according to ASTM D1505.

9. The polyolefin composition according to claim 1, wherein an Izod impact performance measured according to ISO180 using testbar 4A at 23° C. is greater than 50 kJ/m².

10. The polyolefin composition according to claim 1, wherein an environment stress crack resistance ESCR performance measured according to ASTM D1693 Bent Strip ESCR test (Bell test) (10% Igepal CO-630, 50° C.) in machine direction 50% failure is greater than 500 hours.

11. The polyolefin composition according to claim 1, wherein the polyolefin composition comprises the polypropylene homopolymer or impact polypropylene in an amount of from greater than 5% by weight to less than 35% by weight, wherein the total amount of the high density polyethylene, the polyolefin elastomer and the polypropylene homopolymer or impact polypropylene is 100% by weight.

12. The polyolefin composition according to claim 1, wherein the polyolefin composition comprises the polypropylene homopolymer or impact polypropylene in a range between 15% by weight and 30% by weight, wherein the total amount of the high density polyethylene, the polyolefin elastomer and the polypropylene homopolymer or impact polypropylene is 100% by weight.

13. The polyolefin composition according to claim 1, wherein the polyolefin composition comprises the polyolefin elastomer in a range between 2% by weight and 25% by weight, wherein the total amount of the high density polyethylene, the polyolefin elastomer and the polypropylene homopolymer or impact polypropylene is 100% by weight.

14. The polyolefin composition according to claim 1, wherein the polyolefin composition comprises the polyolefin elastomer in a range between 9% by weight and 21% by weight, wherein the total amount of the high density polyethylene, the polyolefin elastomer and the polypropylene homopolymer or impact polypropylene is 100% by weight.

15. The polyolefin composition according to claim 1, wherein the polyolefin composition comprises the high density polyethylene in a range between 45% by weight and 80% by weight, wherein the total amount of the high density polyethylene, the polyolefin elastomer and the polypropylene homopolymer or impact polypropylene is 100% by weight.

16. The polyolefin composition according to claim 1, wherein the polyolefin composition comprises the high density polyethylene in a range between 50% by weight and 80% by weight, wherein the total amount of the high density polyethylene, the polyolefin elastomer and the polypropylene homopolymer or impact polypropylene is 100% by weight.

17. The polyolefin composition according to claim 1, wherein an amount of the polypropylene is higher than an amount of the polyolefin elastomer based on a wt % of polypropylene and a wt % of polyolefin elastomer in the composition.

18. The polyolefin composition according to claim 1, wherein a melt flow index of the polypropylene is greater than 0.3 g/10 min and less than 4 g/10 min, measured according to ISO 1133 at 230 degrees Celsius and 2.16 kg.

19. A blow molded article or an injection molded article comprising the polyolefin composition according to claim 1.

20. Pipe system parts, solar hot water tanks, dangerous goods containers, industrial containers, fuel tanks, caps or closures comprising the polyolefin composition according to claim 1.

* * * * *